United States Patent
Maat et al.

(10) Patent No.: US 8,208,228 B2
(45) Date of Patent: Jun. 26, 2012

(54) CURRENT-PERPENDICULAR-TO-THE-PLANE (CPP) MAGNETORESISTIVE READ HEAD WITH MULTIPLE SENSING ELEMENTS FOR PATTERNED-MEDIA

(75) Inventors: Stefan Maat, San Jose, CA (US); James Terrence Olson, Santa Cruz, CA (US); Hal J. Rosen, Los Gatos, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 434 days.

(21) Appl. No.: 12/565,721

(22) Filed: Sep. 23, 2009

(65) Prior Publication Data

US 2011/0069413 A1   Mar. 24, 2011

(51) Int. Cl.
  *G11B 5/39* (2006.01)
  *G11B 5/11* (2006.01)
  *G11B 5/265* (2006.01)

(52) U.S. Cl. ............ 360/314; 360/319; 360/324.2

(58) Field of Classification Search .......... 360/319, 360/324.2, 314, 324.12, 320
  See application file for complete search history.

(56) References Cited

U.S. PATENT DOCUMENTS

| | | | |
|---|---|---|---|
| 5,229,901 A | 7/1993 | Mallary | |
| 5,798,890 A | 8/1998 | Fontana et al. | |
| 5,898,548 A | 4/1999 | Dill et al. | |
| 6,271,998 B1 | 8/2001 | Coehoorn et al. | |
| 6,542,342 B1 | 4/2003 | Hayashi et al. | |
| 6,717,780 B2 * | 4/2004 | Hiramoto et al. | 360/324.2 |
| 6,937,421 B2 | 8/2005 | Rubin et al. | |
| 7,062,838 B2 * | 6/2006 | Ding et al. | 29/603.12 |
| 7,408,730 B2 | 8/2008 | Yamagishi et al. | |
| 2002/0145835 A1 * | 10/2002 | Suzuki et al. | 360/324.2 |
| 2008/0204915 A1 | 8/2008 | Albrecht et al. | |
| 2008/0212228 A1 | 9/2008 | Shibano | |

* cited by examiner

*Primary Examiner* — Julie Anne Watko
(74) *Attorney, Agent, or Firm* — Thomas R. Berthold

(57) ABSTRACT

A magnetoresistive (MR) sensor or read head for a magnetic recording disk drive has multiple independent current-perpendicular-to-the-plane (CPP) MR sensing elements. The sensing elements are spaced-apart in the cross-track direction and separated by an insulating separation region so as to be capable of reading data from multiple data tracks on the disk. The sensing elements have independent CPP sense currents, each of which is directed to independent data detection electronics, respectively. Each sensing element comprises a stack of layers formed on a common electrically conducting base layer, which may be a bottom magnetic shield layer formed of electrically conducting magnetically permeable material. Each sensing element has a top electrical lead layer. A top magnetic shield layer is located above the sensing elements in contact with the top lead layers. The top shield layer is formed of soft magnetically permeable material, but is electrically insulating, so that the independent sense currents can be passed to the independent sensing elements.

17 Claims, 6 Drawing Sheets

CURRENT-PERPENDICULAR-TO-THE-PLANE (CPP) MAGNETORESISTIVE READ HEAD WITH MULTIPLE SENSING ELEMENTS FOR PATTERNED-MEDIA

BACKGROUND OF THE INVENTION

1. Field of the Invention

This invention relates generally to read heads for patterned magnetic recording media, such as disks for use in magnetic recording hard disk drives, and more particularly to a read head capable of reading multiple data tracks from the patterned medium.

2. Background of the Invention

One type of proposed patterned magnetic recording media is referred to as "bit-patterned media" (BPM). In a BPM disk, the magnetizable material on the disk is patterned into discrete concentric data tracks, with each track patterned into small isolated data islands such that there is a single magnetic domain in each island or "bit". The single magnetic domains can be a single grain or consist of a few strongly coupled grains that switch magnetic states in concert as a single magnetic volume. This is in contrast to conventional "continuous media" disks wherein a single "bit" may have multiple magnetic domains separated by domain walls. To produce the required magnetic isolation of the patterned islands, the magnetic moment of the spaces between the islands must be destroyed or substantially reduced so as to render these spaces essentially nonmagnetic. In one type of BPM disk, the data islands are elevated, spaced-apart pillars that are separated by nonmagnetic trenches or recesses.

Another type of proposed patterned magnetic recording media is referred to as "discrete-track media" (DTM). In a DTM disk, the magnetizable material on the disk is also patterned into discrete concentric data tracks. However, unlike a BPM disk the tracks in a DTM disk are not patterned into isolated data islands but are formed as continuous magnetizable material. In a DTM disk, the data tracks are typically elevated lands that contain magnetic material. Trenches or grooves that are recessed below the elevated lands serve as nonmagnetic guard bands between the tracks. The nonmagnetic guard bands are either formed of nonmagnetic material or contain magnetic material but are recessed far enough below the elevated data tracks to not adversely affect the readback signals from the data tracks.

The data in patterned-media BPM and DTM disks can be read back by a conventional magnetoresistive (MR) sensor or read head like that used in conventional continuous-media magnetic recording disk drives. One type of MR read head is based on the giant magnetoresistance (GMR) effect. A GMR sensor has a stack of layers that includes two ferromagnetic layers separated by a nonmagnetic electrically conductive spacer layer, which is typically copper (Cu). In one type of GMR sensor, called a "spin-valve", one of the ferromagnetic layers has its magnetization direction fixed, such as by being pinned by exchange coupling with an adjacent antiferromagnetic layer, and the other ferromagnetic layer has its magnetization direction "free" to rotate in the presence of an external magnetic field. With a sense current applied to the sensor and in the presence of an applied magnetic field, the rotation of the free-layer magnetization relative to the pinned-layer magnetization is detectable as a change in electrical resistance.

In a magnetic recording disk drive spin-valve read sensor or head, the stack of layers are located in the read "gap" between magnetic shields. The magnetization of the pinned layer is generally perpendicular to the plane of the disk, and the magnetization of the free layer is generally parallel to the plane of the disk in the absence of an external magnetic field. When exposed to an external magnetic field from the recorded data on the disk, the free-layer magnetization will rotate, causing a change in electrical resistance. If the sense current flowing through the stack is directed parallel to the planes of the layers in the sensor stack, the sensor is referred to as a current-in-the-plane (CIP) sensor, while if the sense current is directed perpendicular to the planes of the layers in the sensor stack, it is referred to as current-perpendicular-to-the-plane (CPP) sensor.

A CPP-GMR spin-valve type of read head is one type of CPP MR sensor or read head. Another type of CPP MR sensor or read head is a magnetic tunnel junction sensor, also called a tunneling magnetoresistance or TMR sensor. While in a CPP-GMR spin-valve type of read head the spacer layer is formed of an electrically conductive material, such as Cu or other metal or metal alloy, the spacer layer in a CPP-TMR type read head is formed of a thin electrically insulating material, such as $TiO_2$, MgO or $Al_2O_3$. Like a CPP-GMR spin-valve type of read head, a CPP-TMR read head also has one of the ferromagnetic layers with its magnetization direction pinned and the other ferromagnetic layer with its magnetization direction free to rotate in the presence of an applied magnetic field from data recorded on the disk. The resistance of a GMR or TMR sensor depends on the relative orientation of the magnetizations in the two ferromagnetic layers.

With the proposed use of BPM and DTM disks in disk drives there is an opportunity to implement improved CPP read heads that take advantage of the fact that the data tracks and data bits are precisely defined and located on the disks. This makes possible the reading and writing of multiple data tracks. The ability to read back multiple data tracks enables a higher data rate and new applications like high-resolution streaming video and high-speed databases without increasing the linear bit density on the disks or the RPM of the disk drives.

SUMMARY OF THE INVENTION

The invention relates to a magnetoresistive (MR) sensor or read head with multiple independent CPP MR sensing elements and a magnetic recording system, such as a disk drive, that incorporates the sensor. The sensing elements may be CPP GMR spin-valve or CPP-TMR sensing elements. The sensing elements are spaced-apart in the cross-track direction and separated by an insulating separation region so as to be capable of reading data from multiple tracks. The independent sensing elements preferably have the same width W in the cross-track direction and are spaced apart a distance S in the cross-track direction. W may be smaller than the track-width TW to reduce edge noise. The spacing S is approximately TP−W, where TP is the track pitch.

The sensing elements are independent and thus have independent CPP sense currents, each of which is directed to independent data detection electronics, respectively. Each sensing element comprises a stack of layers formed on a common electrically conducting base layer, which may be a bottom magnetic shield layer S1 formed of electrically conducting magnetically permeable material like permalloy ($Ni_{80}Fe_{20}$). Each sensing element has a top electrical lead layer. A top magnetic shield layer S2 is located above the sensing elements in contact with the top lead layers. The top shield layer S2 is formed of soft magnetically permeable material, but is electrically insulating, so that the independent sense currents can be passed to the independent sensing elements.

A hard magnetic biasing layer may also be included, with hard biasing layer segments located outside the spaced-apart sensing elements, near the side edges of the free layers of the sensing elements, for longitudinal biasing of the magnetizations of the free layers.

The read head may have two or more independent sensing elements, with the sensing elements spaced apart in the cross-track direction so that each element is aligned with a data track. Additionally, the sensing elements may be spaced apart by more than one track. For such an embodiment, if the spacing S is large enough, an additional segment of the hard biasing layer may be located in the insulating separation region between the sensing elements.

For a fuller understanding of the nature and advantages of the present invention, reference should be made to the following detailed description taken together with the accompanying figures.

DETAILED DESCRIPTION OF THE INVENTION

Figure 1:
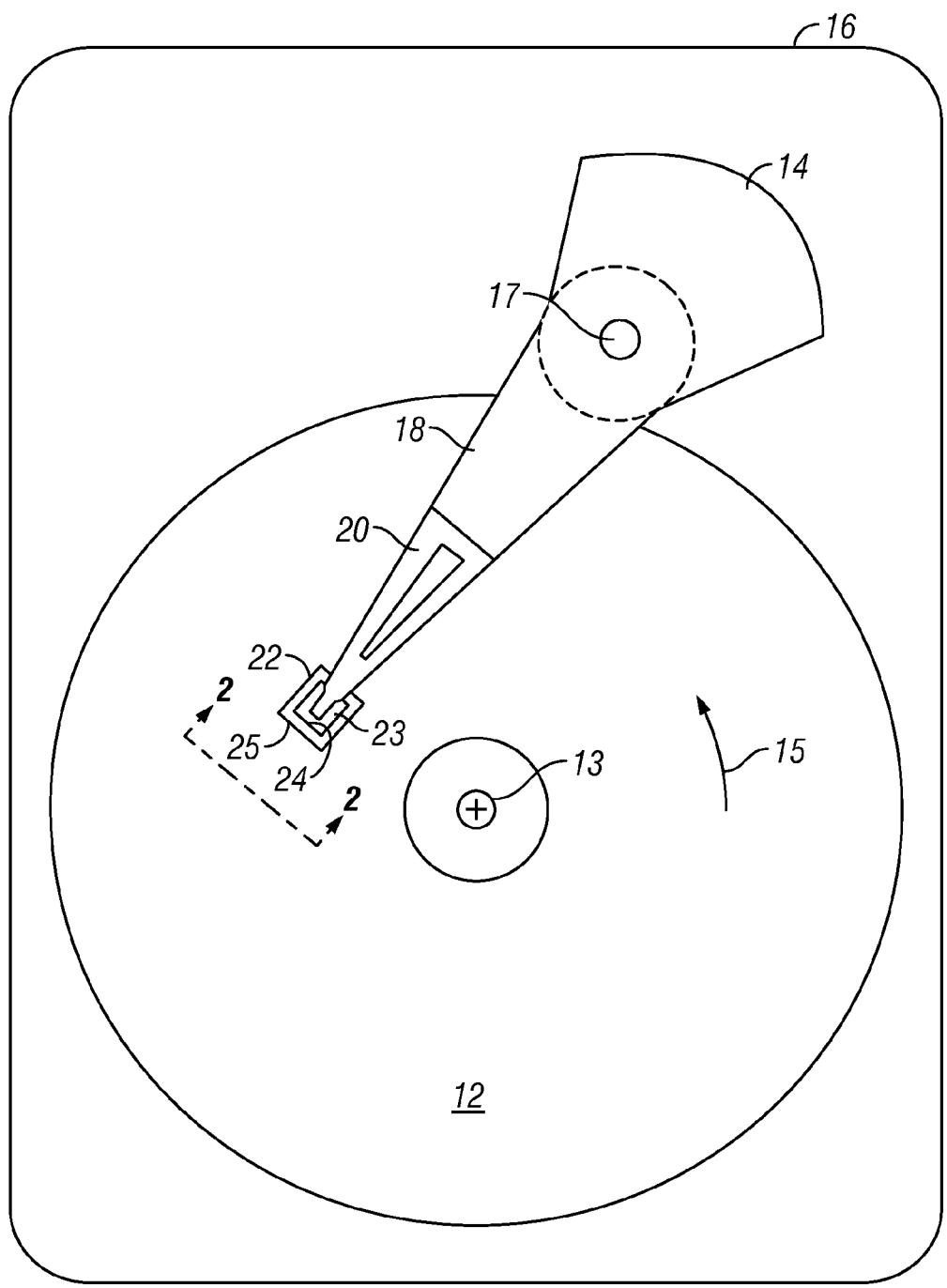
FIG. 1 is a schematic top view of a conventional magnetic recording hard disk drive with a patterned-media disk with the cover removed.

The CPP MR read head according to this invention has application for use in a magnetic recording disk drive with patterned-media disks. The operation of such a disk drive with a conventional CPP read head will be briefly described with reference to FIGS. 1-3. As shown in FIG. 1, the disk drive includes a magnetic recording disk 12 and a rotary voice coil motor (VCM) actuator 14 supported on a disk drive housing or base 16. The disk 12 has a center of rotation 13 and is rotated in direction 15 by a spindle motor (not shown) mounted to base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write head 24 is formed on the trailing surface 25 of slider 22. The flexure 23 and suspension 20 enable the slider to "pitch" and "roll" on an air-bearing generated by the rotating disk 12. Typically, there are multiple disks stacked on a hub that is rotated by the spindle motor, with a separate slider and read/write head associated with each disk surface.

Figure 2:
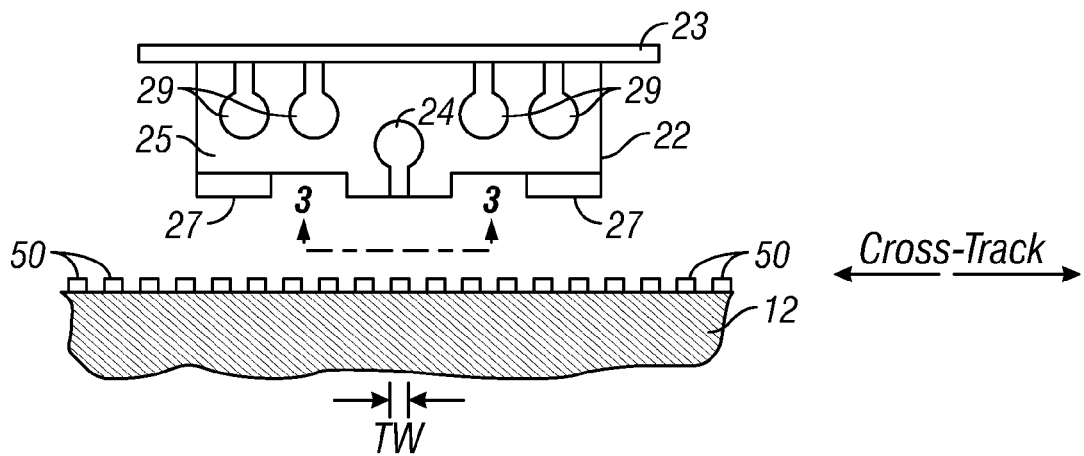
FIG. 2 is an enlarged end view of the slider and a section of the disk taken in the direction 2-2 in FIG. 1, illustrating the discrete data tracks of the patterned media disk.

FIG. 2 is an enlarged end view of the slider 22 and a section of the disk 12 taken in the direction 2-2 in FIG. 1. The slider 22 is attached to flexure 23 and has an air-bearing surface (ABS) 27 facing the disk 12 and a trailing surface 25 generally perpendicular to the ABS. The ABS 27 causes the airflow from the rotating disk 12 to generate a bearing of air that supports the slider 20 in very close proximity to or near contact with the surface of disk 12. The read/write head 24 is formed on the trailing surface 25 and is connected to the disk drive read/write electronics by electrical connection to terminal pads 29 on the trailing surface 25. As shown in the sectional view of FIG. 2, the disk 12 is a patterned-media disk with discrete data tracks 50 spaced-apart in the cross-track direction, one of which is shown as being aligned with read/write head 24. The data tracks 50 have a track width TW in the cross-track direction and may be formed of continuous magnetizable material in the circumferential direction, in which case the patterned-media disk 12 is a DTM disk. Alternatively, the data tracks 50 may contain discrete data islands spaced-apart along the tracks, in which case the patterned-media disk 12 is a BPM disk.

Figure 3:
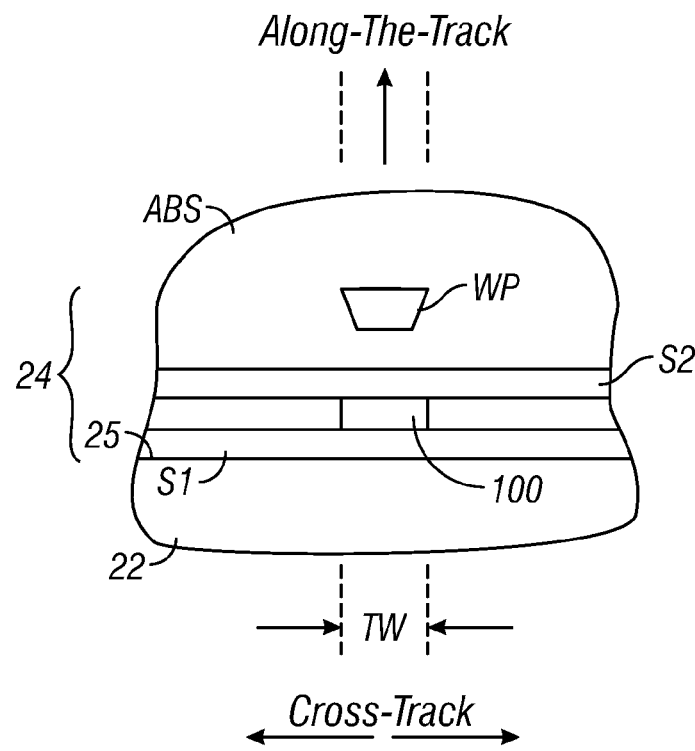
FIG. 3 is a view in the direction 3-3 of FIG. 2 and shows the ends of the read/write head as viewed from the disk.

FIG. 3 is a view in the direction 3-3 of FIG. 2 and shows the ends of read/write head 24 as viewed from the disk 12. The read/write head 24 is a series of thin films deposited and lithographically patterned on the trailing surface 25 of slider 22. The write head includes a perpendicular magnetic write pole WP and may also include trailing and/or side shields (not shown). The CPP MR sensor or read head 100 is located between two magnetic shields S1 and S2. The shields S1, S2 are formed of magnetically permeable material and may also be electrically conductive so they can function as the electrical leads to the read head 100. Separate electrical leads may also be used, in which case the read head 100 is formed in contact with layers of electrically conducting lead material, such as tantalum, gold, or copper, that are in contact with the shields S1, S2.

Figure 4A:
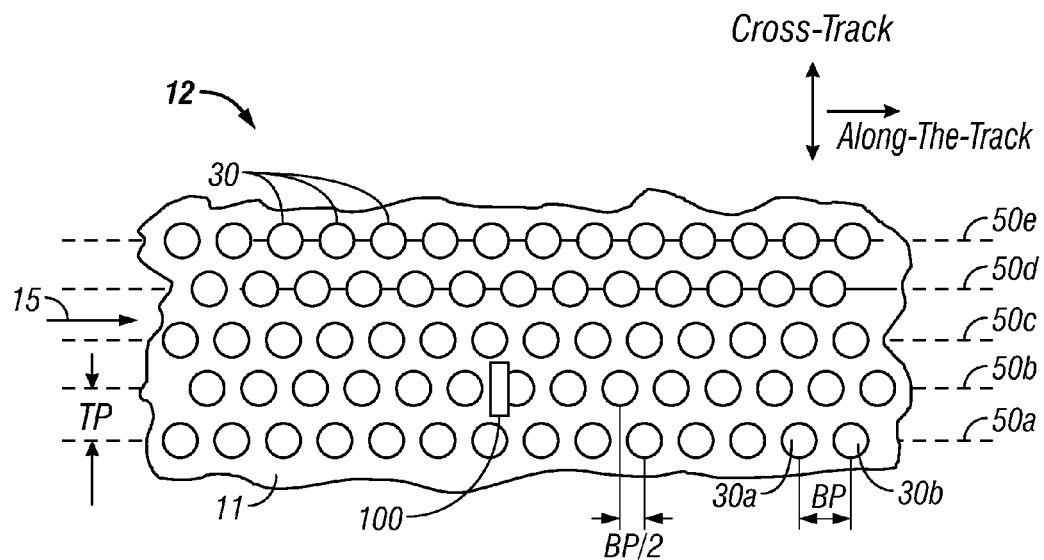
FIG. 4A is a top view of an enlarged portion of a bit-patterned media (BPM) disk showing an arrangement of the data islands and the read head aligned with one of the data tracks according to the prior art.

FIG. 4A is a view of a portion of the patterned-media disk 12 as a BPM disk and includes a disk substrate 11 with discrete data islands 30 of magnetizable material on the substrate 11. The data islands 30 are arranged in radially-spaced circular tracks 50, with only a few islands 30 and representative tracks 50a-50e being shown. The read head 100 is shown as being aligned with data track 50b. The tracks are equally spaced apart in the radial or cross-track direction by a fixed track spacing or track pitch TP. The data islands 30 are spaced-apart in the along-the-track direction by a bit spacing or bit pitch BP, as shown by data islands 30a, 30b. In FIG. 4A the adjacent data tracks are shifted relative to one another in the along-the-track direction by a distance BP/2. However, BPM disks may have the data tracks arranged without any shifting, so that the data islands in adjacent data tracks are aligned radially.

Figure 4B:
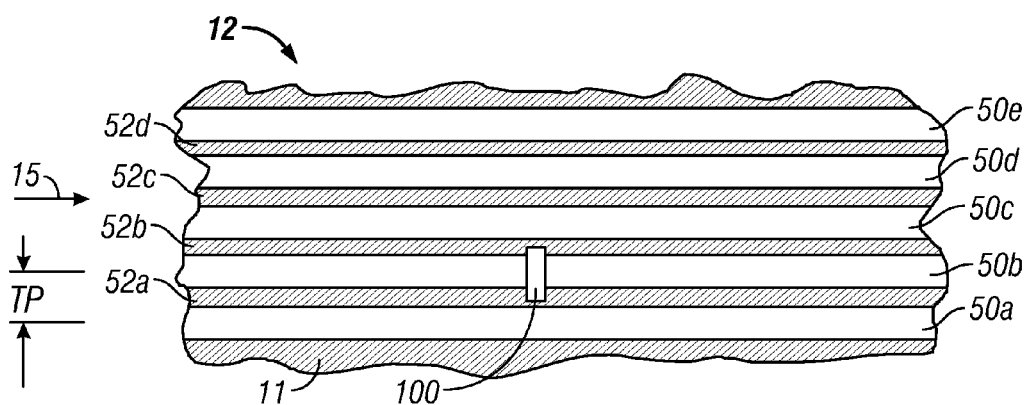
FIG. 4B is a top view of an enlarged portion of a discrete-track media (DTM) disk showing the discrete data tracks and the read head aligned with one of the data tracks according to the prior art.

FIG. 4B is a view of a portion of the patterned-media disk 12 as a DTM disk and includes a disk substrate 11 with discrete radially-spaced circular tracks 50, with only representative tracks 50a-50e being shown. However, unlike the BPM disk of FIG. 4A, each of the data tracks 50a-50e is formed of continuous magnetizable material. The read head 100 is shown as being aligned with data track 50b. The regions or guard bands 52a-52d between the tracks 50a-50e are nonmagnetic, or if formed of magnetic material do not contribute to the readback signal from read head 100.

Patterned-media disks like that shown in FIGS. 4A-4B may be longitudinal magnetic recording disks, wherein the magnetization directions in the magnetizable recording material are parallel to or in the plane of the recording layer in the islands, or perpendicular magnetic recording disks, wherein the magnetization directions are perpendicular to or out-of-the-plane of the recording layer in the islands. In this invention, the BPM and DTM disks are preferably perpendicular magnetic recording disks. To produce the required magnetic isolation of the patterned data islands in BPM disks and discrete data tracks in DTM disks, the magnetic moment of the regions between the islands and tracks must be destroyed or substantially reduced to render these spaces essentially nonmagnetic. Patterned-media disks may be fabricated by any of several known techniques.

Figure 5:
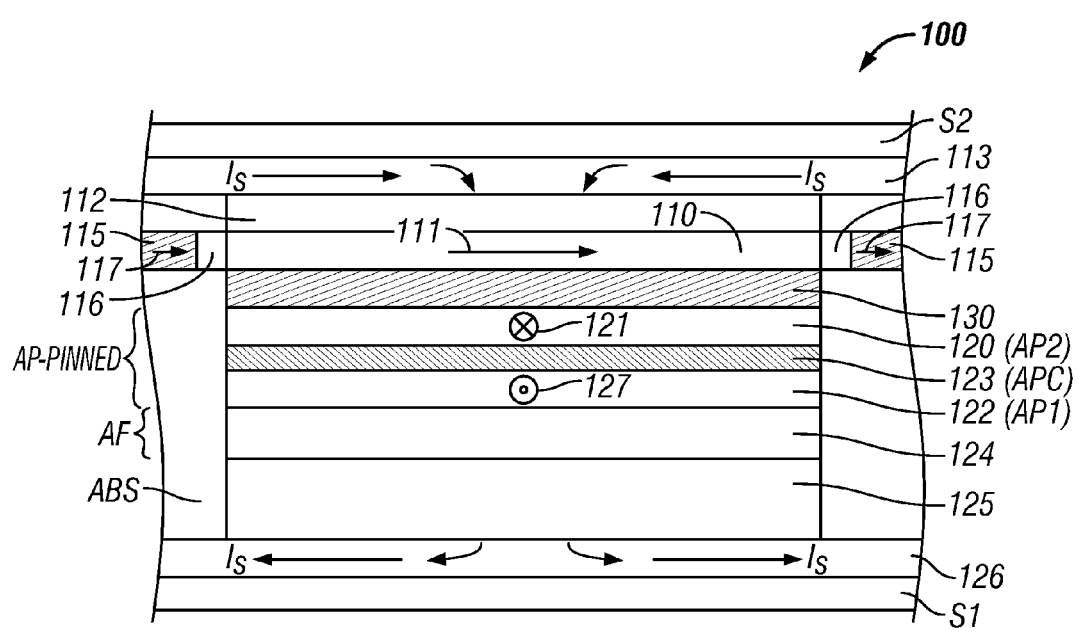
FIG. 5 is a cross-sectional view, as seen from the disk, of a conventional CPP-GMR spin-valve type of read head showing the stack of layers located between the magnetic shield layers.

FIG. 5 is a view from the disk towards the ABS showing the layers making up sensor 100. Sensor 100 is a conventional CPP-GMR spin-valve type of read head comprising a stack of layers formed between the two magnetic shield layers S1, S2 that are typically electroplated NiFe alloy films. The lower shield S1 is typically polished by chemical-mechanical polishing (CMP) to provide a smooth substrate for the growth of the sensor stack. This may leave an oxide coating which can be removed with a mild etch just prior to sensor deposition. The sensor layers include a reference ferromagnetic layer 120 having a fixed magnetic moment or magnetization direction 121 oriented transversely (into the page), a free ferromagnetic layer 110 having a magnetic moment or magnetization direction 111 that can rotate in the plane of layer 110 in response to transverse external magnetic fields from the disk 12, and an electrically conducting spacer layer 130, typically copper (Cu), between the reference layer 120 and free layer 110.

The reference layer 120 may be a conventional "simple" or single pinned layer that has its magnetization direction 121 pinned or fixed, typically by being exchange coupled to an antiferromagnetic layer. However, in the example of FIG. 5, the reference layer 120 is part of the well-known antiparallel (AP) pinned structure, also called a "laminated" pinned layer, as described in U.S. Pat. No. 5,465,185. The AP-pinned structure minimizes magnetostatic coupling of the reference layer 120 with the free layer 110. The AP-pinned structure includes the reference ferromagnetic (AP2) layer 120 and a lower ferromagnetic (AP1) layer 122 that are antiferromagnetically coupled across an AP coupling (APC) layer 123, such as Ru, Ir, Rh, or Cr, or alloys thereof. The free ferromagnetic layer 110, spacer layer 130 and AP2 layer 120 together make up what is called the "active region" of the sensor. The AP1 and AP2 ferromagnetic layers have their respective magnetization directions 127, 121 oriented antiparallel. The AP-pinned structure may be "self-pinned" or the AP1 layer 122 may have its magnetization direction pinned by being exchange-coupled to an antiferromagnetic (AF) layer 124 or pinned by a hard magnetic layer such as $Co_{100-x}Pt_x$ or $Co_{100-x-y}Pt_xCr_y$ (where x is between about and 8 and 30 at. %). In a "self pinned" sensor the AP1 and AP2 layer magnetization directions 127, 121 are typically set generally perpendicular to the disk surface by magnetostriction and the residual stress that exists within the fabricated sensor. It is desirable that the AP1 and AP2 layers have similar magnetic moments. This assures that the net magnetic moment of the AP-pinned structure is small so that magneto-static coupling to the free layer is minimized and the effective pinning field of the AF layer 124, which is approximately inversely proportional to the net magnetization of the AP-pinned structure, remains high.

Located between the lower shield layer S1 and the AP-pinned structure are the bottom electrical lead 126 and a seed layer 125. The seed layer 125 may be a single layer or multiple layers of different materials. Located between the free ferromagnetic layer 110 and the upper shield layer S2 are a capping layer 112 and the top electrical lead 113. The capping layer 112 may be a single layer or multiple layers of different materials, such as Cu, Ru, Rh or Ta.

In the presence of an external magnetic field in the range of interest, i.e., magnetic fields from recorded data on the disk 12, the magnetization direction 111 of free layer 110 will rotate while the magnetization direction 121 of reference layer 120 will remain fixed and not rotate. Thus when a sense current $I_S$ is applied from top lead 113 perpendicularly through the stack to bottom lead 126, the magnetic fields from the recorded data on the disk will cause rotation of the free-layer magnetization 111 relative to the reference-layer magnetization 121, which is detectable as a change in electrical resistance.

The leads 126, 113 are typically Ta or Rh. However, a lower resistance material may also be used. They are optional and used to adjust the shield-to-shield spacing. If the leads 126 and 113 are not present, the bottom and top shields S1 and S2 are used as leads. The seed layer 125 is typically one or more layers of NiFeCr, NiFe, Ta, Cu or Ru. The AF layer 124 is typically a Mn alloy, e.g., PtMn, NiMn, FeMn, IrMn, PdMn, PtPdMn or RhMn. If a hard magnetic layer is used instead of an AF layer it is typically a CoPt or FePt alloy, for example CoPtCr. The capping layer 112 provides corrosion protection and is typically formed of Ru or Ta. The ferromagnetic layers 122 (AP1), 120 (AP2), and 110 (free layer) are typically formed of a crystalline alloy such as CoFe or NiFe, or a multilayer of these materials, such as a CoFe/NiFe bilayer.

The AP2 layer can also be a laminated structure to obtain a high degree of spin-dependent interface scattering. For example the AP2 layer can be a FM/XX/FM/ . . . /XX/FM laminate, where the ferromagnetic (FM) layers are formed of Co, Fe or Ni, one of their alloys, or a multilayer of these materials, such as a CoFe—NiFe—CoFe trilayer; and the XX layers are nonmagnetic layers, typically Cu, Ag, Si, Al, Ge, Ti, or Au or their alloys, and are thin enough that the adjacent FM layers are ferromagnetically coupled.

For an example, the AP2 layer 120 may be a CoFe alloy, typically 10 to 30 Å thick, and the free ferromagnetic layer 110 may be a bilayer of a CoFe alloy, typically 10-15 Å thick and formed on the spacer layer 130, and a NiFe alloy, typically 10-30 Å thick, formed on the CoFe layer. The APC layer in the AP-pinned structure is typically Ru or Ir with a thickness between about 4-10 Å.

A hard magnetic biasing layer 115, such as a CoPt or CoCrPt layer, may also be included outside the sensor stack near the side edges of the free ferromagnetic layer 110 for longitudinal biasing of the magnetization 111 of the free ferromagnetic layer 110. The biasing layer 115 is electrically insulated from free layer 110 by insulating regions 116, which may be formed of alumina, for example. The biasing layer 115 has a magnetization 117 generally parallel to the ABS and thus longitudinally biases the magnetization 111 of the free ferromagnetic layer 110. Hence in the absence of an external magnetic field the magnetization 111 of the free layer 110 is parallel to the magnetization 117 of biasing layer 115. The ferromagnetic biasing layer 115 may be a hard magnetic biasing layer or a ferromagnetic layer that is exchange-coupled to an antiferromagnetic layer. Alternatively, the biasing layer may be located in the stack of layers making up sensor 100. A CPP-GMR spin-valve type of read head with in-stack longitudinal biasing is described in U.S. Pat. No.

6,680,832, and a CPP-TMR read head with in-stack longitudinal biasing is described in U.S. Pat. No. 6,023,395.

One or more of the free layer 110, the AP2 layer 120, the capping layer 112 and the conductive nonmagnetic spacer layer 130 may also include a nano-oxide layer (NOL) to locally confine the current path and increase the effective resistance of the active region. A CoFe NOL may be formed, for example, by interrupting the deposition after some CoFe has been deposited somewhere in the free layer, the AP2 layer, the capping layer, or the conductive spacer layer and oxidizing its surface for several minutes in an $O_2$ or $O_2$/Ar gas at 0.1-10 Torr. NOLs can be formed by oxidizing other materials, e.g., Cu/Al or Cu/Ti alloys or multilayers.

While the read head 100 shown in FIG. 5 is a "bottom-pinned" read head because the AP-pinned structure is below the free layer 110, the free layer 110 can be located below the AP-pinned structure (or below the single pinned layer if a simple pinned layer is used). In an arrangement where free layer 110 is located below an AP-pinned structure the layers of the AP-pinned structure are reversed, with the AP2 layer 120 on top of and in contact with the spacer layer 130.

The CPP sensor 100 described above and illustrated in FIG. 5 is a CPP-GMR spin-valve type of sensor. However, a CPP-TMR sensor may also function as the read head for BPM and DTM disks. In a CPP-TMR sensor the nonmagnetic spacer layer 130 would be formed of an electrically insulating material, such as $TiO_2$, MgO or $Al_2O_3$.

Figure 6A:
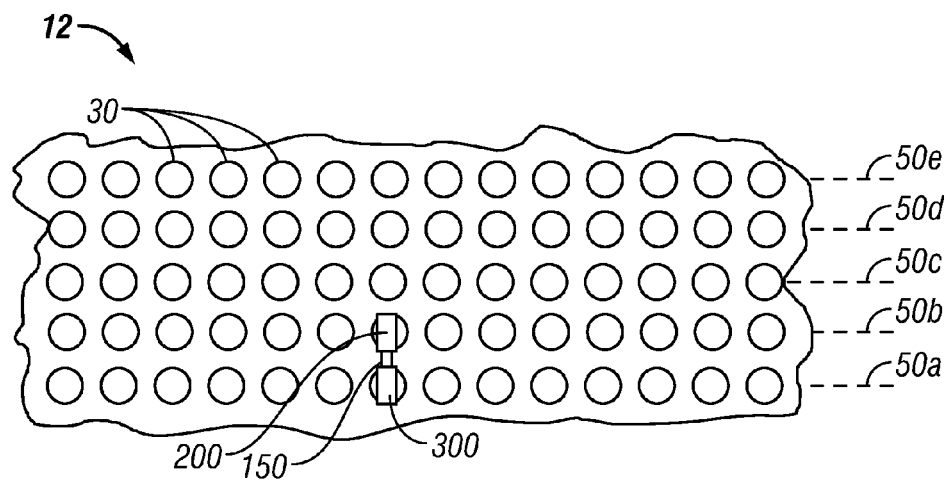
FIG. 6A is a top view of an enlarged portion of a BPM disk showing an arrangement of the data islands and the multiple-element read head of this invention aligned with one of the data tracks.
Figure 6B:
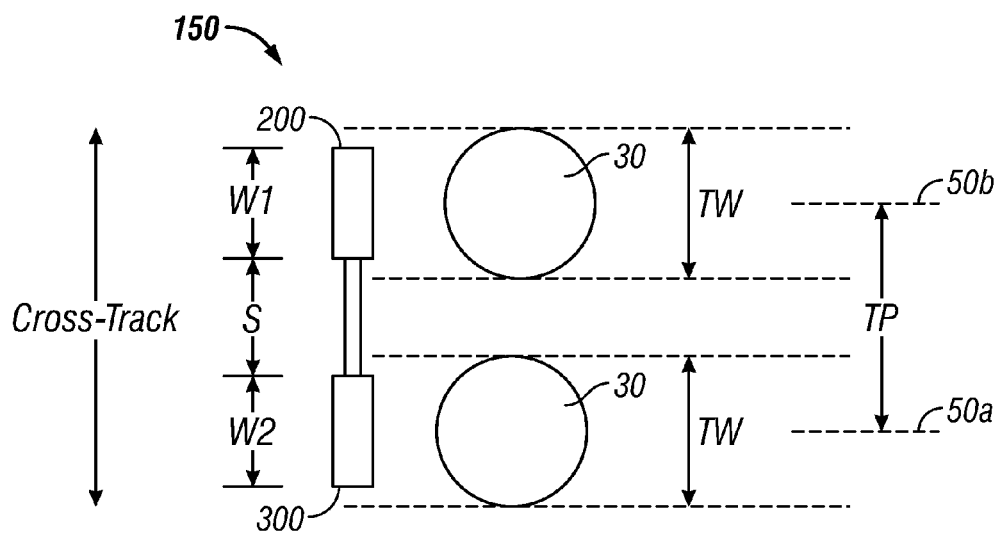
FIG. 6B is an illustration showing the dimensions of the multiple-element read head of this invention relative to the data tracks of a BPM disk.

In this invention, the read head includes multiple independent CPP MR sensing elements spaced-apart in the cross-track direction so as to be capable of reading data from multiple tracks. This is depicted schematically in FIG. 6A for an example where the read head 150 is a dual-element head and where the disk 12 is a BPM disk with data tracks 50a-50e having data islands 30. The head 150 is shown with sensing elements 200, 300 aligned with data tracks 50b, 50a, respectively. The head 150 is shown with sensing elements 200, 300 aligned on tracks that are approximately at the middle diameter (MD) of the disk so there is no "skew" of the elements 200, 300. As shown in FIG. 6B, the independent sensing elements 200, 300 have widths in the cross-track direction of W1, W2, respectively, with W1 and W2 preferably being equal. The sensing elements 200, 300 are spaced apart a distance S. W1 and W2 may be smaller than the trackwidth TW to reduce edge noise. The spacing S is approximately TP−W1, where TP is the track-pitch and assuming W1=W2. In one example, for a disk with an areal density of about 1 Terabits/in², TP is about 53 nm, TW is about 40 nm, W is about 34 nm, and the spacing S is about 19 nm.

Figure 7:
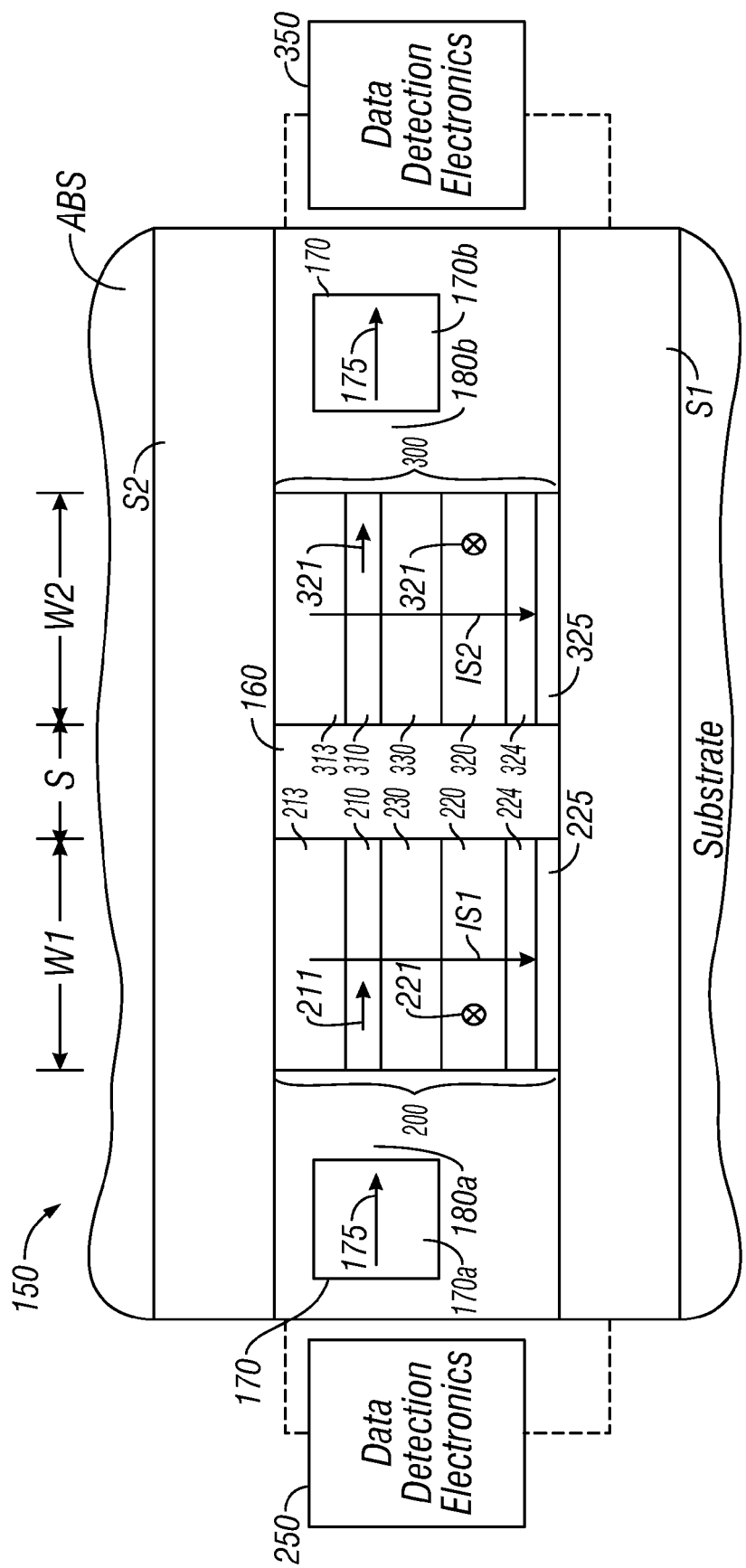
FIG. 7 is a cross-sectional view, as seen from the disk, of the multiple-element CPP MR read head according to this invention showing the stack of layers located between the magnetic shield layers.

FIG. 7 is a view from the disk towards the ABS of read head 150 showing the layers making up the dual-element sensor 150 according to this invention. Sensor 150 has two CPP MR sensing elements 200, 300 separated by an insulating separation region 160. The sensing elements 200, 300 are independent and thus have independent CPP sense currents shown by arrows IS1 and IS2, respectively, each of which is directed to independent data detection electronics or circuitry 250, 350, respectively. Each sensing element 200, 300 is depicted as a CPP-GMR spin-valve type of element comprising a stack of layers formed on a common lower electrically conducting base layer, which may be a magnetic shield layer S1 formed of magnetically permeable material like permalloy ($Ni_{80}Fe_{20}$). Shield layer S1 is formed on a substrate, which is the material of the trailing surface 25 of slider 22 (FIG. 2).

The sensor layers in sensing element 200 include a simple pinned ferromagnetic layer 220 having a fixed magnetic moment or magnetization direction 221 oriented transversely (into the page), an antiferromagnetic layer 224, which is typically a Mn alloy (e.g., PtMn, NiMn, FeMn, IrMn, PdMn, PtPdMn or RhMn PtMn or IrMn), for pinning the magnetization 221 of pinned layer 220, a free ferromagnetic layer 210 having a magnetic moment or magnetization direction 211 that can rotate in the plane of layer 210 in response to external magnetic fields from the disk 12, and a nonmagnetic electrically conducting spacer layer 230, typically copper (Cu), between the pinned layer 220 and free layer 210. Instead of a simple pinned layer, the pinned layer 220 may be an AP-pinned structure like that described above for the conventional CPP sensor 100 (FIG. 5).

The sensing element 300 is identical to sensing element 200. Thus, the sensor layers in sensing element 300 include a simple pinned ferromagnetic layer 320 having a fixed magnetic moment or magnetization direction 321 oriented transversely (into the page), an antiferromagnetic layer 324 for pinning the magnetization 321 of pinned layer 320, a free ferromagnetic layer 310 having a magnetic moment or magnetization direction 311 that can rotate in the plane of layer 310 in response to external magnetic fields from the disk 12, and an electrically conducting spacer layer 330, typically copper (Cu), between the pinned layer 320 and free layer 310. Instead of a simple pinned layer, the pinned layer 320 may be an AP-pinned structure like that described above for the conventional CPP sensor 100 (FIG. 5).

Located between the lower shield layer S1 and the antiferromagnetic layers 224, 324 are seed layers 225, 325. Each of the seed layers 225, 325 may be a single layer or multiple layers of different materials. Instead of the shield layer S1 acting as the electrically conducting lead layer for sense currents IS1, IS2, a separate electrically conducting base layer may be formed on shield layer S1 to act as a common lead. However, it is preferred to use shield layer S1 as the lower lead layer to reduce the shield-to-shield spacing of the sensing elements 200, 300.

Located above free layers 210, 310 are electrically conducting top lead layers 213, 313, respectively, which are typically formed of Cu. Optional capping layers (not shown), such as single or multiple layers of different materials, such as NiFeCr, NiFe, Cu, Ru, Rh or Ta, may be formed between free layers 210, 310 and lead layers 213, 313, respectively. The two lead layers 213, 313, are electrically isolated from one another by insulating separation region 160. Each of the lead layers 213, 313 is connected through terminals (like terminal pads 29 in FIG. 1) to a current source or sources that provide independent sense currents IS1, IS2, respectively, perpendicularly through the sensing elements 200, 300, respectively, to the common lead layer of S1.

A top magnetic shield S2 is located above sensing elements 200, 300 in contact with lead layers 213, 313. The top shield S2 is formed of soft magnetically permeable material, but is electrically insulating, so that the independent sense currents can be passed to the independent sensing elements 200, 300. Shield S2 may be formed of nickel ferrite ($NiFe_2O_4$) or other soft ferrites like manganese or zinc ferrites or their alloys. Instead of an insulating shield layer S2, a separate insulating layer (not shown) can be formed above sensing elements 200, 300 in contact with lead layers 213, 313, and then a shield layer S2 formed of conducting material like permalloy formed on the separate insulating layer. However, in this invention the insulating shield layer S2 is preferred because it reduces the shield-to-shield spacing of the sensing elements 200, 300.

A hard magnetic biasing layer 170, such as a CoPt or CoCrPt layer, may also be included outside the spaced-apart sensing elements, 200, 300 near the side edges of the free layers 210, 310 for longitudinal biasing of the magnetizations 211, 311 of the free layers 210, 310. The biasing layer segments 170a, 170b are electrically insulated from free layers 210, 310 by insulating regions 180a, 180b, which may be formed of alumina ($Al_2O_3$), for example. The biasing layer 170 has a magnetization 175 generally parallel to the ABS and thus longitudinally biases the magnetizations 211, 311. Hence in the absence of an external magnetic field the free layer magnetizations 211, 311 are parallel to the magnetization of biasing layer segments 170a and 170b. The ferromagnetic biasing layer 170 may be a hard magnetic biasing layer or a ferromagnetic layer that is exchange-coupled to an antiferromagnetic layer. As an alternative to the edge biasing provided by biasing layer segments 170a, 170b, a separate ferromagnetic biasing layer may be located in the stack of layers making up each sensing element 200, 300. However, in-stack biasing increases the shield-to-shield spacing of the sensing elements 200, 300.

The dual element CPP sensor 150 is formed using well-known processes for making the conventional CPP-GMR spin-valve and CPP-TMR read heads. All of the layers in the stack of layers in the sensing elements 200, 300 are deposited sequentially as full films on the lower shield layer S1. The films are then patterned, by conventional or electron-beam lithography, and etched to define the separate stacks for sensing elements 200, 300. Electrically insulating material, such as alumina, is then deposited on the sides of the sensing elements and into the region between the sensing elements. Additional lithography is then used to deposit and pattern the hard biasing segments 170a, 170b, and then additional insulating material is deposited, resulting in the insulating separation region 160 between the sensing elements and insulating material surrounding the hard biasing segments 170a, 170b. The upper shield layer S2 is then deposited over the sensing elements.

While the dual element read head 150 shown in FIG. 7 is a "bottom-pinned" read head because the pinned layers 220, 320 are below the free layers 210, 310, respectively, the free layers 210, 310 can be located below the pinned layers 220, 320, respectively.

The CPP dual element sensor 150 described above and illustrated in FIG. 7 is a CPP-GMR spin-valve type of sensor. However, the sensing elements 200, 300 may each be a CPP-TMR sensing element, in which case the nonmagnetic spacer layers 230, 330 would be formed of an electrically insulating material, such as $TiO_2$, MgO or $Al_2O_3$.

In the presence of an external magnetic field in the range of interest, i.e., magnetic fields from recorded data in the islands 30 in the data tracks 50b, 50a on the disk 12 (FIG. 6A), the magnetization directions 211, 311 of free layers 210, 310 will rotate while the magnetization directions 221, 321 of pinned layers 220, 320 will remain fixed and not rotate. Thus when a sense current IS1 is applied from top lead 213 perpendicularly through the stack of layers in sensing element 200 to bottom shield layer S1, the magnetic fields from the data islands 30 in data track 50b will cause rotation of the free-layer magnetization 211 relative to the pinned-layer magnetization 221, which is detectable as a change in electrical resistance and thus as readback data by data detection electronics 250. Simultaneously, and independently of the data detection from sensing element 200 on data track 50b, when a sense current IS2 is applied from top lead 313 perpendicularly through the stack of layers in sensing element 300 to bottom shield layer S1, the magnetic fields from the data islands 30 in data track 50a will cause rotation of the free-layer magnetization 311 relative to the pinned-layer magnetization 321, which is detectable as a change in electrical resistance by data detection electronics 350 and thus as readback data independent from the readback data from sensing element 200.

If the read head 150 with dual sensing elements 200, 300 is used with a BPM disk like that shown in FIG. 4A, wherein the data bits in adjacent tracks are shifted by BP/2, the data bits would be detected alternately from adjacent tracks, i.e., sensing element 200 would detect a data bit from its track and sensing element 300 would then independently detect a data bit from its track, and this pattern would repeat. The disk drive electronics may then combine the readback signals from the independent sensing elements, resulting in a doubling of the data rate over that which would be achieved if only a single read element were used, like that depicted by sensing element 100 aligned with track 50b in FIG. 4A.

The multiple-element read head 150 according to this invention also provides an advantage where the recorded data are large continuously recorded files, such as large video files. Referring to FIG. 6A, such a file may be recorded continuously from one complete track to adjacent complete tracks. When it is desired to read back such a file, the data is read back continuously from the track 50a aligned with sensing element 300 and then continuously from the track 50b aligned with sensing element 200, without radial movement of the read head 150. The disk drive electronics switches between reading back data from the electronics 350 associated with sensing element 300 and the electronics 250 associated with sensing element 200, which eliminates the delay associated with the actuator 14 (FIG. 1) moving the slider 22.

While the read head 150 according to this invention has been described with two sensing elements, the read head may have multiple sensing elements, with the independent sensing elements spaced-apart in the cross-track direction so that each element is aligned with a data track. Additionally, the sensing elements may be spaced apart by more than one track. For example, referring to FIG. 6A, if the read head 150 is a dual-element head, it may be designed with the sensing elements two tracks apart so that when sensing element 200 is aligned with track 50c, sensing element is aligned with track 50a. In this example, the spacing S would be approximately n*TP−W, assuming W=W1=W2 and where n is an integer equal to the number of tracks the two sensing elements are apart. For such an embodiment, if the spacing S is large enough, an additional segment of biasing layer 170 may be located in the separation region between the sensing elements and aligned generally in the same plane as outer segments 170a, 170b (FIG. 7). Such a design may be desirable to ensure adequate stabilization of the free layers.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetoresistive read head for reading magnetically recorded data from patterned data tracks on a magnetic recording medium when a sense current is applied perpendicular to the planes of the layers in the read head, the read head comprising:
 a substrate;
 an electrically conductive base layer on the substrate;
 first and second spaced-apart magnetoresistive sensing elements on the base layer, each sensing element comprising a pinned ferromagnetic layer, a free ferromagnetic layer having an in-plane magnetization direction substantially free to rotate in the presence of an external magnetic field, and a nonmagnetic spacer layer between the pinned ferromagnetic layer and the free ferromagnetic layer, wherein the pinned ferromagnetic layer in each of the first and second sensing elements is an antiparallel (AP) pinned structure comprising a first AP-pinned (AP1) ferromagnetic layer having an in-plane magnetization direction, a second AP-pinned (AP2) ferromagnetic layer having an in-plane magnetization direction substantially antiparallel to the magnetization direction of the AP1 layer, and an AP coupling (APC) layer between the AP1 layer and the AP2 layer;

a first electrically conductive lead layer on the first sensing element;

a second electrically conductive lead layer on the second sensing element;

an electrically insulating layer on the first and second lead layers for electrically isolating the first lead layer and sensing element from the second lead layer and sensing element; and electrically insulating material in the region between the spaced-apart first and second sensing elements.

2. The read head of claim 1 further comprising a ferromagnetic biasing layer for biasing the magnetization of the free ferromagnetic layer in each of the first and second sensing elements, each free ferromagnetic layer having a magnetization substantially parallel to the magnetization of the biasing layer in the absence of an external magnetic field.

3. The read head of claim 2 wherein the biasing layer is a hard magnetic layer having a first segment generally coplanar with the free layer of the first sensing element and a second segment generally coplanar with the free layer of the second sensing element.

4. The read head of claim 3 wherein the biasing layer has a third segment generally coplanar with the free layers of the first and second sensing elements and located between the first and second sensing elements.

5. The read head of claim 1 wherein the pinned ferromagnetic layer in each of the first and second sensing elements is located between the substrate and the free ferromagnetic layer in each of said first and second sensing elements.

6. The read head of claim 1 wherein the base layer is a first shield formed of magnetically permeable material.

7. The read head of claim 1 wherein the insulating layer on the first and second lead layers is a second shield formed of magnetically permeable material.

8. The read head of claim 7 wherein the second shield is formed of a material consisting essentially of a ferrite selected from the group consisting of a nickel ferrite, a manganese ferrite and a zinc ferrite.

9. The read head of claim 1 wherein the read head is a giant magnetoresistance spin-valve (GMR-SV) read head and the nonmagnetic spacer layer in each of the first and second sensing elements is electrically conductive.

10. The read head of claim 1 wherein the read head is a tunneling magnetoresistance (TMR) read head and the nonmagnetic spacer layer in each of the first and second sensing elements is electrically insulating.

11. A perpendicular magnetic recording disk drive comprising:

a patterned-media disk having a plurality of discrete concentric data tracks having a radial track pitch TP and containing perpendicularly magnetizable material;

a read head comprising:
 a substrate;
 an electrically conductive base layer on the substrate;
 first and second spaced-apart magnetoresistive sensing elements on the base layer, each sensing element comprising a pinned ferromagnetic layer, a free ferromagnetic layer having an in-plane magnetization direction substantially free to rotate in the presence of an external magnetic field, and a nonmagnetic spacer layer between the pinned ferromagnetic layer and the free ferromagnetic layer;
 a first electrically conductive lead layer on the first sensing element;
 a second electrically conductive lead layer on the second sensing element;
 an electrically insulating layer on the first and second lead layers for electrically isolating the first lead layer and sensing element from the second lead layer and sensing element; and
 electrically insulating material in the region between the spaced-apart first and second sensing elements;

a first data detection circuit connected to said first sensing element;

a second data detection circuit connected to said second sensing element;

an air-bearing slider for supporting said read head near the surface of said disk during rotation of said disk, wherein said read head is supported with the first and second sensing elements spaced-apart in a generally radial direction;

an actuator attached to the slider for moving the slider and supported read head generally radially across the discrete concentric data tracks; and wherein each of the first and second sensing elements of said read head has a width W in the generally radial direction, and wherein the first and second sensing elements are spaced apart by a spacing S equal to approximately n*TP minus W, wherein n is an integer.

12. The disk drive of claim 11 wherein each of the discrete data tracks is patterned into discrete data islands spaced-apart in the along-the track direction.

13. The disk drive of claim 11 wherein each of the discrete data tracks is a track of continuous magnetizable material.

14. A magnetoresistive read head for reading magnetically recorded data from patterned data tracks on a magnetic recording medium when a sense current is applied perpendicular to the planes of the layers in the read head, the read head comprising:

a substrate;
an electrically conductive base layer on the substrate;
first and second spaced-apart magnetoresistive sensing elements on the base layer, each sensing element comprising a pinned ferromagnetic layer, a free ferromagnetic layer having an in-plane magnetization direction substantially free to rotate in the presence of an external magnetic field, and a nonmagnetic spacer layer between the pinned ferromagnetic layer and the free ferromagnetic layer;

a first electrically conductive lead layer on the first sensing element;

a second electrically conductive lead layer on the second sensing element;

an electrically insulating layer on the first and second lead layers for electrically isolating the first lead layer and sensing element from the second lead layer and sensing element;

electrically insulating material in the region between the spaced-apart first and second sensing elements; and a ferromagnetic biasing layer for biasing the magnetization of the free ferromagnetic layer in each of the first and second sensing elements, each free ferromagnetic layer having a magnetization substantially parallel to the magnetization of the biasing layer in the absence of an external magnetic field, wherein the biasing layer is a hard magnetic layer having a first segment generally coplanar with the free layer of the first sensing element, a second segment generally coplanar with the free layer of the second sensing element and a third segment generally coplanar with the free layers of the first and second sensing elements and located between the first and second sensing elements.

15. A magnetoresistive read head for reading magnetically recorded data from patterned data tracks on a magnetic recording medium when a sense current is applied perpendicular to the planes of the layers in the read head, the read head comprising:
    a substrate;
    an electrically conductive first shield formed of magnetically permeable material on the substrate;
    first and second spaced-apart magnetoresistive sensing elements on the first shield, each sensing element comprising a pinned ferromagnetic layer, a free ferromagnetic layer having an in-plane magnetization direction substantially free to rotate in the presence of an external magnetic field, and a nonmagnetic spacer layer between the pinned ferromagnetic layer and the free ferromagnetic layer;
    a first electrically conductive lead layer on the first sensing element;
    a second electrically conductive lead layer on the second sensing element;
    an electrically insulating second shield formed of magnetically permeable material on the first and second lead layers for electrically isolating the first lead layer and sensing element from the second lead layer and sensing element; and
    electrically insulating material in the region between the spaced-apart first and second sensing elements.

16. The read head of claim 15 wherein the second shield is formed of a material consisting essentially of a ferrite selected from the group consisting of a nickel ferrite, a manganese ferrite and a zinc ferrite.

17. A giant magnetoresistance spin-valve (GMR-SV) read head for reading magnetically recorded data from patterned data tracks on a magnetic recording medium when a sense current is applied perpendicular to the planes of the layers in the read head, the read head comprising:
    a substrate;
    an electrically conductive base layer on the substrate;
    first and second spaced-apart magnetoresistive sensing elements on the base layer, each sensing element comprising a pinned ferromagnetic layer, a free ferromagnetic layer having an in-plane magnetization direction substantially free to rotate in the presence of an external magnetic field, and an electrically conductive nonmagnetic spacer layer between the pinned ferromagnetic layer and the free ferromagnetic layer;
    a first electrically conductive lead layer on the first sensing element;
    a second electrically conductive lead layer on the second sensing element;
    an electrically insulating layer on the first and second lead layers for electrically isolating the first lead layer and sensing element from the second lead layer and sensing element; and
    electrically insulating material in the region between the spaced-apart first and second sensing elements.

* * * * *